(No Model.)

H. S. WILSON.
WINDMILL MOTOR.

No. 273,212. Patented Feb. 27, 1883.

Attest.
John C. Perkins
H. Jay Hammond

Inventor.
Herbert S. Wilson
By Lucius C. West
Atty.

UNITED STATES PATENT OFFICE.

HERBERT S. WILSON, OF KALAMAZOO, MICHIGAN, ASSIGNOR OF ONE-HALF TO H. JAY HAMMOND, OF SAME PLACE.

WINDMILL-MOTOR.

SPECIFICATION forming part of Letters Patent No. 273,212, dated February 27, 1883.

Application filed September 5, 1882. (No model.)

*To all whom it may concern:*

Be it known that I, HERBERT S. WILSON, a citizen of the United States, residing at Kalamazoo, county of Kalamazoo, State of Michigan, have invented a new and useful Windmill-Motor, of which the following is a specification.

My invention has for its leading object to overcome the undue friction in windmill-motors by dispensing with complex frictional gear and substituting a belt-and-pulley mechanism, substantially as hereinafter set forth. Other objects are pointed out in the detailed description.

Figure 1:
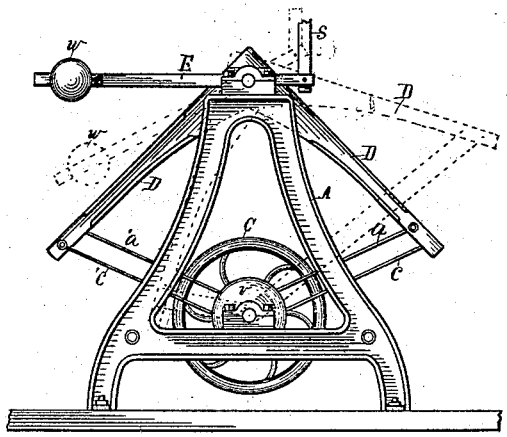
Figures 2, 3:
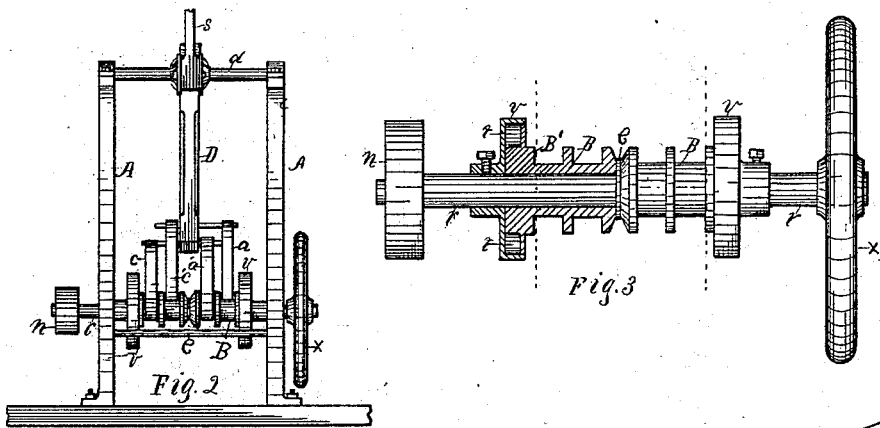
Figure 4:
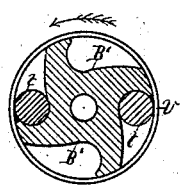
Figure 5:
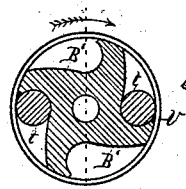
Figure 6:
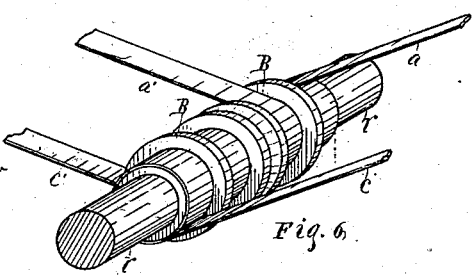
Figure 7:
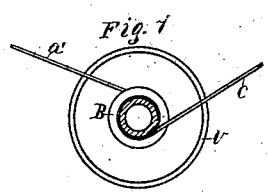

In the drawings forming a part of this specification, Figure 1 is a side elevation; Fig. 2, a view looking from the right of Fig. 1; Fig. 3, an enlarged view of the pulley-shaft, having a portion in section on dotted line in Fig. 5; Figs. 4 and 5, internal plan of the clutch devices; Fig. 6, enlarged view of belts and pulleys in perspective, and Fig. 7 cross-section of pulley-shaft on dotted lines in Fig. 3.

A A is the motor-frame supporting the revoluble shaft $r$ and rocking shaft $d$.

$n$ is a belt-pulley with which other machinery may be connected, and $x$ is a balance-wheel.

With the rocking shaft is connected a double lever, D D, Fig. 1.

E is a lever, one end of which connects with the rocking shaft, said end extending a little beyond and connecting with shaft S, which connects above with the wheel-crank. (Not here shown.) The other end of lever E is provided with a weight, $w$, to compensate for the weight of the pitman S, bearing down on the other end, in order that the double lever D D shall be equally balanced. Shaft $r$ is provided with disks $v$ $v$, keyed stationary to revolve with it.

B B are revoluble sleeves or pulleys, with which are integrally formed the clutch-blocks B' B', said blocks being located in the disks $v$ $v$, Figs. 3, 4, 5. Recesses are formed in the clutch-blocks, in which are loosely located wheels $t$ $t$, (two or more,) of such a diameter and length as to just fill the space designed for them in the recesses between the side walls of the disks and the outer rim. The recesses are so formed that when the clutch-block revolves in one direction the wheels are carried around in said recess; but by reversing the motion the wheels become wedged in between the wall of the recess and the outer rim of the disk $v$, when said disk revolves in and turns shaft $r$, as explained in the operation. The pulleys B B are separated by a washer, $e$, which prevents their engaging each other during their revolution. With said pulleys are connected the belts $c$ $c'$ $a$ $a'$, said belts being pivotally connected with the arms of the double lever D D, all in a manner that belts $a$ $c$ on one side shall unwind when belts $c'$ $a'$ wind up, and vice versa, and that the pulleys of each set of belts shall revolve in opposite directions when the levers D D swing backward and forward, as explained in the operation.

By combining such a construction with the running mechanism of a windmill the power needed to run the motor and do the other work required—such as pumping, grinding, &c.—is not exhausted by friction of parts, and there is no dead-center to overcome.

In the operation, as pitman S rises, throwing levers D D in the position shown by dotted lines in Fig. 1, belts $a$ $c$ unwind, revolving their respective pulleys in opposite directions, and belts $c'$ $a'$ wind up, and vice versa. This movement causes the clutch-blocks to alternately revolve in their disks, or to carry said disks with them, thus imparting a rotary movement to shaft $r$. The reason is that when the blocks revolve in the direction shown by the arrows in Figs. 4 and 5 the wheels $t$ $t$ wedge in the decreasing space between the outer rim of the disk $v$ and the wall of the recess, causing the disks to revolve with them; but when the blocks revolve in the opposite direction the wheels $t$ $t$ loosely rest in the hollow of the recess, and said blocks turn in the disks.

Having thus described my invention, what I claim as new is—

1. The rocking shaft having the double lever, provided with the belts pivotally connected with them, in combination with the shaft having the clutch-disks secured thereto, and the belt-pulleys having the integrally-connected clutch-blocks provided with the recesses shown, and the wheels located therein, all substantially as set forth.

2. The rock-shaft provided with the double lever, the belts, and a shaft provided with pulleys and clutch-blocks, all substantially as described and shown.

3. The pulley-shaft, pulleys, belts, the double lever secured to the rocking shaft, the pitman connecting the double lever with the mill-crank, and a weight to counterbalance the weight of the pitman, all in combination, substantially as set forth.

HERBERT S. WILSON.

Witnesses:
H. J. HAMMOND,
JOHN C. PERKINS.